United States Patent Office 3,420,720
Patented Jan. 7, 1969

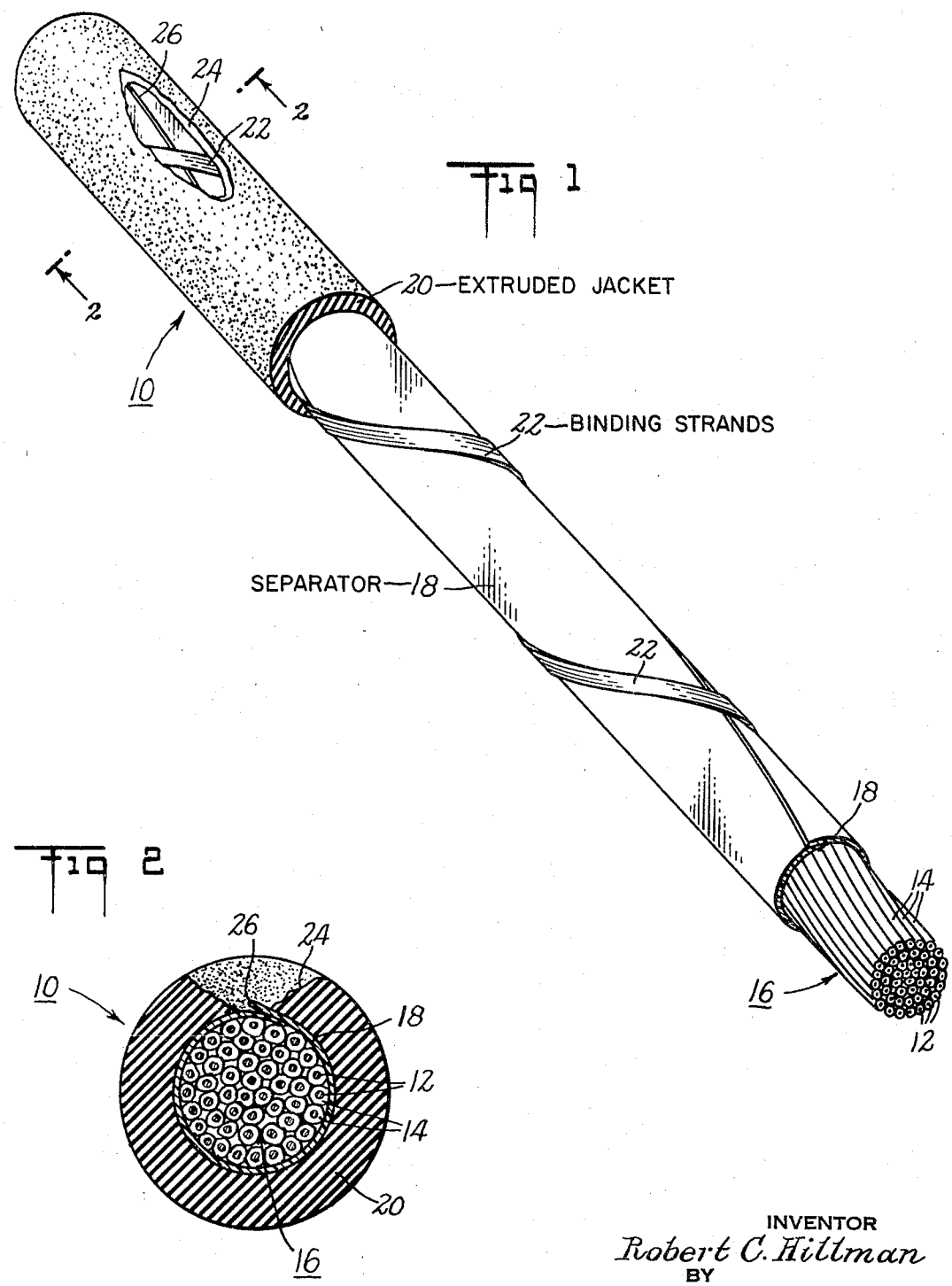

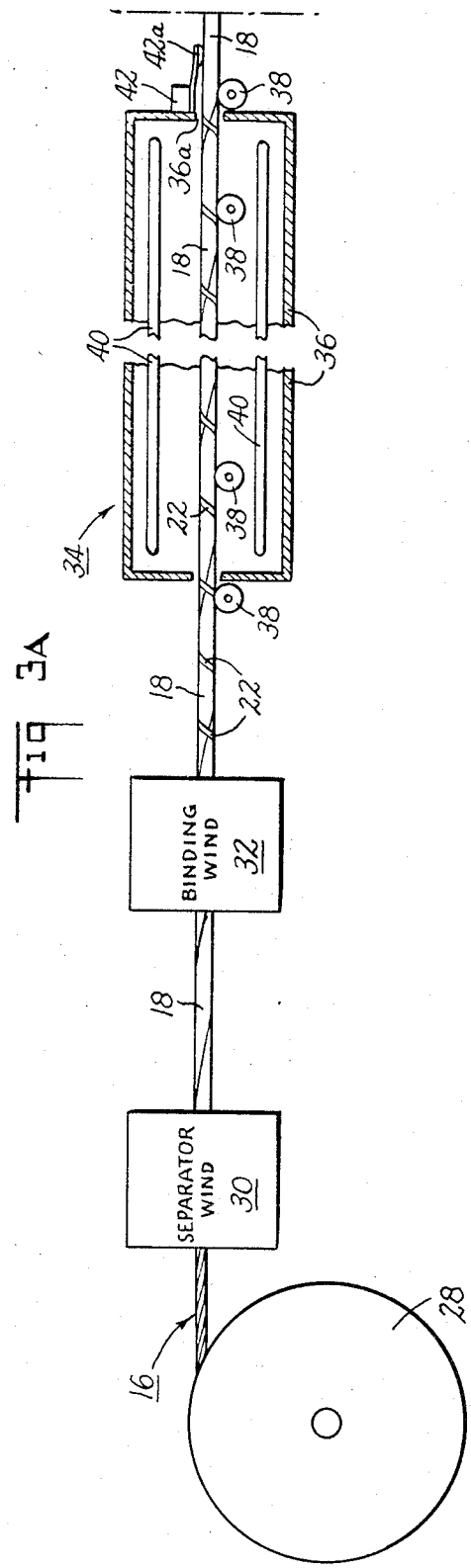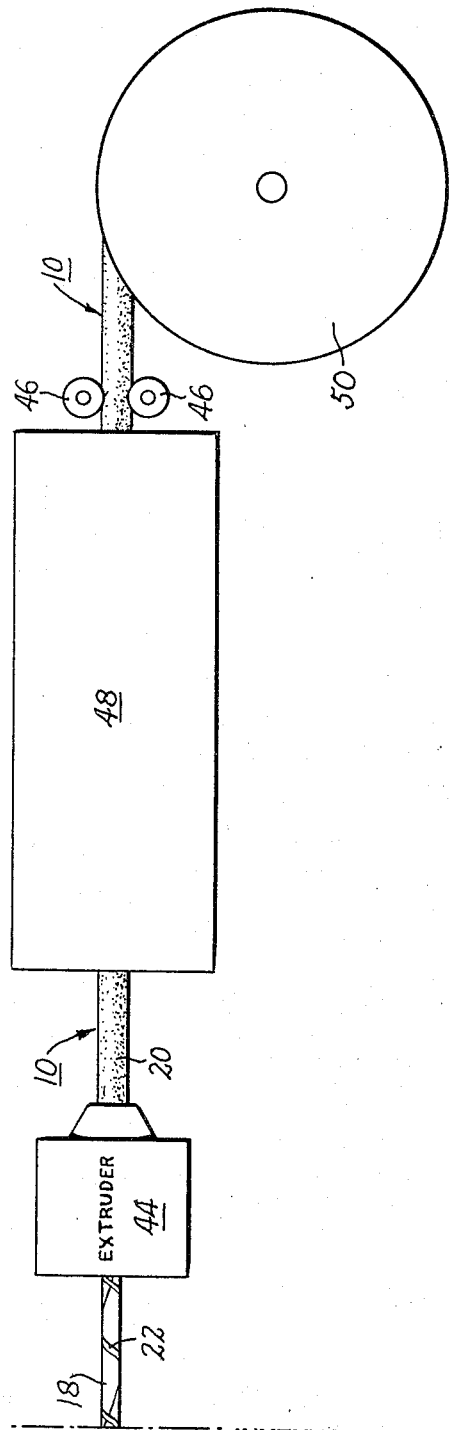

3,420,720
METHOD OF MAKING JACKETED MULTI-CONDUCTION ELECTRICAL CABLE
Robert C. Hillman, Cheshire, Conn., assignor to The Whitney Blake Company, New Haven, Conn.
Filed Nov. 8, 1963, Ser. No. 322,283
U.S. Cl. 156—53         4 Claims
Int. Cl. H01b 13/08; H01b 13/14

This invention relates to the method of forming multi-conductor electrical cables, and more particularly to an improved process of forming such cables while avoiding the coincidental formation of breaks and discontinuities in the cable jacket. The invention is additionally directed to an improved multi-conductor electrical cable formed by the improved process.

In the art of making multi-conductor cables difficulties have been encountered in forming a continuous and uninterrupted extruded jacket around an insulated cable core consisting of a plurality of individually insulated electrical conductors. Such cables are generally manufactured in lengths of several thousands of feet and the protective jacket around such cables must be continuous and without breaks in order to meet specifications. The continuous cable jacket is extruded around the cable core of insulated conductors after the cable core has been wrapped with a thin, stiff separator of polyester material. The occurrence of breaks in the extruded cable jacket has been found to be principally caused by sharp protruding edges of the separator wrapping. The separator edges cause disruptions in the flow of the hot jacketing material during extrusion, which result in weakened points in the jacket. Since the cable is being drawn through the extruder under tension, these weakened points in the jacket are expanded into sizable holes before the jacketing material is cooled to a stronger condition.

Cable of this type is usually sold in long lengths, thus a single break in the jacket results in substantial waste since the cable manufacturer must then cut out the defective section and attempt to sell the shorter pieces of cable to another purchaser.

In addition, the existence of breaks or discontinuities in the cable jacket permits the entry of moisture which has a deleterious effect on the dielectric and capacitance characteristics of the cable and may, in time, result in shorts across the conductors. This moisture may result from condensation on cooling of the extruded jacket and from climatical conditions while in service. The short section of cable including the jacket discontinuity may thus be characterized as wholly unserviceable.

Accordingly, it is an object of this invention to provide a method for covering multi-conductor cables having a continuous protective jacket;

An additional object is to provide an improved multi-conductor electrical cable having a continuous and uninterrupted protective outer jacket;

Another object of the invention is to provide a method of the above character wherein the cable core separator does not adversely affect the application of jacketing material thereover;

A further object of the invention is to provide methods of the above character wherein the exposed edges of the separator do not disrupt the jacketing material during formation of the jacket;

Another object of the invention is to provide methods of the above character wherein the separator is heat treated before entering the jacketing extruder.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 1 is a perspective view of a short section of multi-conductor cable showing a break in the cable jacket.

FIGURE 2 is a sectional view taken along lines 2—2 of FIGURE 1.

FIGURES 3A and 3B, in combination, form an elevated schematic diagrammatic view of the process steps in forming cable according to the invention.

Referring first to FIGURES 1 and 2, it will be seen that a typical communications cable generally indicated at 10 comprises a number of conductors 12, each of which is covered with a primary insulation 14. These conductors 12, in their co-mingled relationship, form a cable core generally indicated at 16 which is covered by a separator 18 over which is extruded a protective jacket 20. The separator 18, preferably made of a strip of terephthalate polyester having a thickness of 0.0005–0.003 inch and a width of 0.875–4.0 inches, is spirally wrapped around the cable core 16. A thread binding 22 may be applied spirally around the separator 18, as shown, to bind the cable core 16 more tightly.

A serious problem arises in the extrusion of the jacket 20 about the cable core 16. As the cable core 16 is drawn through an extruder, weak points may be inadvertently created in the jacket 20, and since the jacketing material is in a heated plastic state as it leaves the extruder, weakened portions of the jacket may break open. The cable 10 is under continuous tension as it is pulled through the extruder, and the break in the jacket 20 may be pulled into a sizable hole as shown at 24 in FIGURE 1. As pointed out above, a cable with such a break in the jacket is unacceptable for most communications purposes and results in a great amount of waste when encountered in cable production.

I have found that the weakening of the cable jacket 20 as it leaves the extruder is primarily due to the slight protrusion of the edge 26 of separator 18 which is exposed to the interior surface of the jacket 20. In fabricating the cable 10, the separator 18, preferably being in strip form, is wound about the cable core in helical fashion. As a consequence, the edge 26 of the separator 18 is in continuous contact with the interior surface of the extruded jacket 20 along the entire length of the cable 10. The potential for the creation of a weak point in the jacket 20 exists throughout the entire length of the cable.

The separator 18 is a necessary adjunct in the cable assembly. Not only is the separator 18 relied upon for its dielectric properties, but it also serves to protect the individual conductors 12 during the extrusion of the jacket 20. Were it not for the inclusion of the separator 18, the hot jacketing material, on direct contact with the cable core 16, would disrupt the primary insulation 14 about the individual conductors 12.

I have discovered that the sharp edge 26 can be softened and the separator 18 tightened around the conductors by the application of heat prior to the application of the cable jacket 20. More specifically, the heating of the cable core 16 prior to entry into the extruder softens and rounds the exposed sharp edge 26 of the separator 18. In addition, by using a separator 18 of a material having the characteristics of terephthalate polyester material shrinkage due to the application of heat tightens the spirally wrapped separator 18 around the cable core 16 and pulls down or shrinks the exposed separator edge 26. The combination of these physical changes in the separator 18 has been found to minimize substantially the creation of holes in the jacket 20 as illustrated at 24 in FIGURE 1.

Referring now to FIGURES 3A and 3B, the cable core 16 consisting of the plurality of individually insulated conductors 12 is played out from a storage reel 28. These conductors 12 have a varying longitudinal twist in order to preserve their co-mingled relationship and to reduce "crosstalk" when in service.

From the storage reel 28, the cable core 16 is fed to a winding machine 30 where the separator tape 18 is wound thereabout. On passage through machine 30, the separator 18 in the form of a continuous strip of terephthalate polyester or the like, more commonly known as Mylar, is helically wrapped around the cable core 16.

A binding machine 32 then applies the thread binding 22 in a reverse helical manner, which serves to tightly bundle the conductors 12 together and to retain the separator 18 about the cable core 16.

Continuing on from the binding machine 32, the cable core 16 encased in separator 18 travels through a heat treating station 34 which includes an enclosure 36 where core 16 is supported on rollers 38. Controllable heating elements 40, such as suitable infrared equipment, are disposed within the enclosure 36 and, preferably, extend along substantially the entire length of travel of the cable core 16 within the enclosure to ensure a uniform temperature throughout. Although only two heating elements 40 are shown, any number may be used in order to achieve the desired temperature conditions within the enclosure 36 for heating the covered cable core 16.

A temperature sensor 42 is mounted on the enclosure 36 adjacent the exit opening 36a having a sensing element 42a located to contact the section of the cable core 16 leaving the enclosure 36 in order to sample the heated temperature of the separator 18. Sensor 42 is then hooked in with suitable switching (not shown) to control the heating elements 40 and thereby ensure desired heat treatment of the separator 18.

I have found that the terephthalate polyester separator 18 should be heated to approximately 120°–150° F., well within its temperature stability range, in the heat treating station 34 to achieve the objects of my invention and yet preserve the integrity of the primary insulation 14 on the individual conductors 12; at the same time such temperature must avoid burning the binder 22. Satisfactory results were achieved by heating the separator 18 to 120° to 130° F. The temperature within the enclosure 36 necessary to elevate the temperature of the separator 18 to the desired range will vary considerably depending on the speed of travel of the cable through the enclosure, the length of the enclosure, the cable size and, to some extent, the thickness of the separator 18. For example, the temperature within the enclosure 36 may vary from 120° to 600° F. while the speed of travel of the cable may vary from 15 to 225 feet per minute.

By way of specific example, for an enclosure 36 six feet long, at a temperature of 400° F. and a cable having six pairs of 22-gage conductors travelling at a rate of 110 feet per minute, the Mylar separator was heated to a temperature of 127° F.

As seen in FIGURE 3B, the cable core 16 is drawn through an extruder 44 by a pair of capstans 46 where jacket 20 is applied. The shrinkage of the separator 18 in the heat treating station 34 results in the drawing of the edge 26 tightly against the underlying layer of separator material. It will be appreciated that by forming the separator 18 from a single strip of Mylar helically wrapped about the cable core 16, the beneficial effect of shrinkage, which may be as high as 2% of the overall length, will result in a considerable tightening of the separator 18 about the cable core 16.

In addition, the heating of the separator 18 will be accentuated at the exposed edge 26, FIGURE 1, resulting in a substantial rounding off of the corners of this edge.

The disruption to the flow of the jacketing material as applied by the extruder 44 due to the existence of edge 26 is thus practically eliminated and, as a result, the problem of holes in the jacket 20 is substantially overcome.

On leaving the extruder 44, the extruded jacket 20 is in a heated plastic state and must be cooled to harden the jacketing material prior to engagement by the capstans 46. Accordingly, the cable 10 is passed through a cooling station 48 disposed between the extruder 44 and the capstans 46.

The cooling station 48 may utilize any well-known technique to rapidly cool and thus harden the extruded jacketing material. For example, the cable 10 may be passed through a coolant bath in cooling station 48. Any suitable coolant, such as water, may be used. Alternatively, the cable 10 may be subjected to a plurality of coolant sprays in order to effect the necessary cooling of the jacket 20. After passing through the capstans 46, the cable is wound on a take-up reel 50 to complete the manufacturing process.

Although my invention contemplates that terephthalate polyester be used as the separator material, it is envisioned that other materials having similar dielectric and thermal characteristics may also be used to form the separator 18.

It will thus be seen that the objects set forth above, among those made apparent from the preceding description, are efficiently attained and, since certain changes may be made in carrying out the above process and in the constructions set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. The method of forming multi-conductor cables having a cable core consisting of a plurality of insulated conductors, said method comprising the steps of
   A. spirally wrapping the cable core with a strip of terephthalate polyester,
      (1) the longitudinal edges of the strip overlapping one another to completely cover the cable core,
   B. passing the wrapped cable core through a heated chamber
      (1) to heat the terephthalate polyester strip to a temperature of 120° to 150° F.,
      (2) whereby shrinkage of the spirally wrapped strip draws the strip tightly about the cable core and the exposed edge of the strip is rounded to alleviate disruption in the formation of a jacket around the wrapped cable core by an extruder, and then
   C. passing the wrapped cable core through a jacketing extruder.

2. The method defined in claim 1 wherein the wrapped cable core is passed through the heating chamber and extruder at a rate of from 15 to 225 feet per minute and the temperature in said heating chamber is from 120 to 600° Fahrenheit.

3. The method of forming multi-conductor cables having a cable core consisting of a plurality of insulated conductors, said method comprising the steps of
   A. spirally wrapping a strip of thermoplastic material around the cable core
      (1) with the longitudinal edges of the material overlapping one another to completely cover the cable core,
B. heating the thermoplastic material while wrapped around the cable core to soften and round off an exposed spiral edge thereof,
C. thereafter applying a flowable thermoplastic jacketing material around said wrapped cable core, and
D. cooling said jacketing material to a solid state.

4. The method of forming multi-conductor cables having a cable core consisting of a plurality of insulated conductors, said method comprising the steps of
A. spirally wrapping a strip of thermoplastic material around the cable core
  (1) with the longitudinal edges of the material overlapping one another to completely cover the cable core,
B. winding a binding strand about the cable core to retain said strip wrapped about the cable core,
C. heating the thermoplastic material while wrapped around the cable core to soften and round off an exposed spiral edge thereof, and to shrink the thermoplastic strip, drawing it tightly about the cable core,
D. and then extruding a thermoplastic jacketing material around said wrapped cable core.

References Cited

UNITED STATES PATENTS

| | | | |
|---|---|---|---|
| 3,031,523 | 4/1962 | Howard | 174—102 |
| 3,033,727 | 5/1962 | Cram et al. | 156—56 |
| 3,087,007 | 4/1963 | Jachimowicz | 174—110 |
| 3,137,120 | 6/1964 | Budenbender | 156—54 X |
| 3,282,758 | 11/1966 | D'Ascoli | 156—86 |
| 3,019,285 | 1/1962 | Delutis | 174—120 |
| 3,025,340 | 3/1962 | Olson | 174—120 |
| 2,536,885 | 1/1951 | Olson | 156—54 |
| 2,538,019 | 1/1951 | Lee | 156—54 |
| 3,304,214 | 2/1967 | Alm | 156—54 |

EARL M. BERGERT, *Primary Examiner.*

T. R. SAVOIE, *Assistant Examiner.*

U.S. Cl. X.R.

156—55, 56; 174—110, 120

UNITED STATES PATENT OFFICE
CERTIFICATE OF CORRECTION

PO-1050
(5/69)

Patent No. 3,420,720          Dated  January 7, 1969

Inventor(s) Robert C. Hillman

It is certified that error appears in the above-identified patent and that said Letters Patent are hereby corrected as shown below:

Title on two sheets of drawings "METHOD OF MAKING JACKETED MULTI-SET CONDUCTOR ELECTRICAL CABLE" should be --METHOD OF MAKING JACKETED MULTI-CONDUCTOR ELECTRICAL CABLE--.
Title on title page "METHOD OF MAKING JACKETED MULTI-CONDUCT ELECTRICAL CABLE" should be --METHOD OF MAKING JACKETED MULTI-CONDUCTOR ELECTRICAL CABLE--.

SIGNED AND
SEALED
APR 14 1970

(SEAL)
Attest:

Edward M. Fletcher, Jr.

Attesting Officer

WILLIAM E. SCHUYLER, JR.
Commissioner of Patents